(12) United States Patent
Kwon et al.

(10) Patent No.: US 9,998,034 B2
(45) Date of Patent: Jun. 12, 2018

(54) ENERGY CONVERSION DEVICE USING LIQUID

(71) Applicant: Korea Electronics Technology Institute, Seongnam-si, Gyeonggi-do (KR)

(72) Inventors: Soon Hyung Kwon, Seoul (KR); Young Hoon Kim, Seongnam-si (KR); Min Suk Oh, Seoul (KR); Ji Wan Kim, Seongnam-si (KR); Byung Wook Yoo, Seongnam-si (KR); Youn Sang Kim, Suwon-si (KR); Jun Woo Park, Yongin-si (KR)

(73) Assignee: Korean Electronics Technology Institute, Seongnam-si (KR)

( * ) Notice: Subject to any disclaimer, the term of this patent is extended or adjusted under 35 U.S.C. 154(b) by 263 days.

(21) Appl. No.: 14/647,865

(22) PCT Filed: Nov. 27, 2013

(86) PCT No.: PCT/KR2013/010818
§ 371 (c)(1),
(2) Date: May 28, 2015

(87) PCT Pub. No.: WO2014/084581
PCT Pub. Date: Jun. 5, 2014

(65) Prior Publication Data
US 2015/0303831 A1 Oct. 22, 2015

(30) Foreign Application Priority Data
Nov. 29, 2012 (KR) .................. 10-2012-0136970

(51) Int. Cl.
*H02N 1/04* (2006.01)
*H02N 11/00* (2006.01)
*F03G 7/00* (2006.01)

(52) U.S. Cl.
CPC ............... *H02N 1/04* (2013.01); *F03G 7/005* (2013.01); *H02N 11/002* (2013.01)

(58) Field of Classification Search
CPC .............................. H02N 1/04; H02N 11/002
(Continued)

(56) References Cited

U.S. PATENT DOCUMENTS 7,898,096 B1 * 3/2011 Krupenkin ............... H02N 1/08
290/1 R
2010/0253184 A1 * 10/2010 Choi ........................ H02N 2/18
310/339

(Continued)

FOREIGN PATENT DOCUMENTS

| EP | 2924869 A1 | 9/2015 |
| JP | 2011-507479 A | 3/2011 |
| JP | 2012-110178 A | 6/2012 |

OTHER PUBLICATIONS

European Patent Office, Communication dated Sep. 13, 2016, issued in counterpart European Application No. 13858306.7.
(Continued)

*Primary Examiner* — Forrest M Phillips
(74) *Attorney, Agent, or Firm* — Sughrue Mion, PLLC

(57) ABSTRACT

The present invention relates to an energy conversion device using a liquid and, more specifically, to a method and a device for converting mechanical energy into electrical energy by applying an opposite phenomenon to an electrowetting phenomenon. The contact surface with liquid is being changed within a pair of electrodes, and the resulting change in the contact surface with liquid is being utilized for generating electrical energy. The device can be simplified and the manufacturing cost thereof is being reduced, furthermore it is effective in implementing an energy conversion device that is less faulty, by preventing channel blocking phenomenon and not requiring a lubricating layer or an (Continued)

electrode complicatedly patterned on a channel. Besides, it is advantageous in that a flexible device can be realized and a large area application is facilitated by simplifying the device structure.

19 Claims, 3 Drawing Sheets

(58) Field of Classification Search
USPC .......................................................... 310/300
See application file for complete search history.

(56) References Cited

U.S. PATENT DOCUMENTS

| | | | | |
|---|---|---|---|---|
| 2010/0295415 A1* | 11/2010 | Despesse | ................. | H02N 1/08 310/300 |
| 2012/0013218 A1* | 1/2012 | Huang | ................. | H03H 3/0072 310/300 |
| 2012/0086307 A1* | 4/2012 | Kandori | ................. | H02N 1/006 310/300 |
| 2012/0126662 A1 | 5/2012 | Miyata | | |
| 2013/0049530 A1* | 2/2013 | Koo | ................... | H01L 41/0986 310/300 |
| 2013/0307370 A1* | 11/2013 | Jenninger | ............. | H01L 41/113 310/300 |
| 2014/0084748 A1* | 3/2014 | Wang | ....................... | H02N 1/04 310/300 |
| 2014/0285060 A1* | 9/2014 | Yamazaki | ............. | B81B 3/0075 310/300 |
| 2014/0292137 A1* | 10/2014 | Le Moal | ................ | H02N 1/008 310/300 |
| 2014/0300248 A1* | 10/2014 | Wang | ....................... | H02N 1/04 310/300 |
| 2014/0360272 A1* | 12/2014 | Kandori | ................. | H02N 1/006 73/643 |
| 2015/0009778 A1* | 1/2015 | Kandori | ................ | B06B 1/0292 367/7 |
| 2015/0061464 A1* | 3/2015 | Park | ....................... | H01L 41/113 310/329 |
| 2015/0222203 A1* | 8/2015 | Kim | ......................... | H02N 1/04 310/310 |
| 2016/0164435 A1* | 6/2016 | Kiil | ..................... | H01L 41/0475 310/300 |
| 2016/0173001 A1* | 6/2016 | Langa | ................... | H02N 1/006 310/300 |

OTHER PUBLICATIONS

International Searching Authority, International Search Report for PCT/KR2013/010818 dated Feb. 25, 2014 [PCT/ISA/210].

* cited by examiner

ENERGY CONVERSION DEVICE USING LIQUID

CROSS REFERENCE TO RELATED APPLICATIONS

This application is a National Stage of International Application No. PCT/KR2013/010818, filed on Nov. 27, 2013, which claims priority from Korean Patent Application No. 10-2012-0136970, filed on Nov. 29, 2012, the contents of all of which are incorporated herein by reference in their entirety.

TECHNICAL FIELD

The present invention relates to an energy conversion device using a liquid, and more specifically, to a method and a device for converting mechanical energy into electric energy by applying an opposite phenomenon of electrowetting.

BACKGROUND ART

The energy conversion technologies for converting mechanical energy into electrical energy of prior art use a principle that electrical capacitance is being created in the electrode not higher than a dielectric material by varying the contact surface of a liquid metal which is in contact with a dielectric material in accordance with the flow of time.

A method and a device for converting energy using a fluid of prior art is being disclosed in the U.S. Pat. No. 7,898,096.

FIG. 1 is a block diagram of a device of prior art for converting energy using a fluid. According to FIG. 1, in a device of prior art for converting energy using a fluid, an electrode is formed to have a consistent pattern on the wall of a thin and long channel, and a dielectric material layer is formed above the electrode. Then, a little waterdrop-like conductive liquid and a non-conductive liquid are being injected into the channel, and by applying a voltage from an external power source to such a waterdrop-like conductive liquid, the conductive liquid is being depolarized.

At this state, when a physical pressure is applied to a predetermined portion (not shown) which is connected to the channel the depolarized waterdrop-like conductive liquid is moved along the channel, and during this process, the contact surface of the multiple electrodes, which is formed with a consistent pattern, with the moving multiple conductive liquid drop is continuously changing with time, and as a result, an electrical energy is generated due to the electrical capacitance change.

However, a method and a device of prior art for converting energy using a fluid have various problems for commercialization.

First, since a reversible movement, wherein a drop-like liquid metal, which has been moved inside the narrow and thin channel, is returning back to its original position when the external force is removed, is difficult, there is a limitation in that a separate lubricating layer is required and an inoperable condition happens due to the easy occurrence of the channel blocking phenomenon.

Moreover, since a method and a device of prior art for converting energy using a liquid adopt a narrow and thin channel structure, the two facing electrodes must be patterned with a fixed shape on the channel wall, and the device configuration becomes complicated due to such a structure, and the size of the module producing electrical energy becomes large, and there are many limitation in mass production or cost reduction.

In addition, as for other problems, it is harmful to the human body and the environment by using a liquid metal such as mercury or galinstan, and there is a limitation in that application of an external separate power source is required for depolarizing such a conductive liquid.

Further, a method and a device of prior art for converting energy using a liquid has problems in that the reversible movements in the channel structure must be continuously implemented, and the control is difficult since the two different kinds of immiscible liquids must be used.

Furthermore, a method and a device of prior art for converting energy using a liquid has problems in that the device is damaged by an external physical force since a piezoelectric material is used therein.

In addition, a method and a device of prior art for converting energy using a liquid has problems in that implementation of a device for large area power generation is difficult, and the price thereof is very high.

SUMMARY OF INVENTION

Technical Problem

An objective of the present invention is to provide a method and a device for converting energy using a liquid for generating electrical energy by changing the contact surface between the liquid and the electrodes.

Another objective of the present invention is to provide a method and a device for converting energy having a simple structure, high conversion efficiency, and low failure rates by using an energy conversion layer.

Yet another objective of the present invention is to provide a method and a device for converting energy capable of producing a flexible device having a simple device structure and facilitating large area application.

Solution to Problem

To achieve above described objectives, an energy conversion device using a liquid is provided, which includes: a first electrode substrate having a concave portion wherein an ionic liquid or water is stored; and a second electrode substrate having a convex portion corresponding to the concave portion and facing the first electrode substrate; wherein the gap between the electrode substrates is being changed by an external physical force, and the surface of the second electrode substrate which is in contact with the ionic liquid and water includes an energy conversion layer generating electrical energy in accordance with the change in the gap.

Preferably, it is being characterized in that the energy conversion layer includes at least any one of an inorganic material layer, an organic material layer and a layer comprising a mixture of organic and inorganic materials.

Preferably, it is being characterized in that a hydrophobic material layer is stacked on the energy conversion layer so as to facilitate a change in contact surface, contact angle or contact area contacting the ionic liquid or the water in accordance with the change in the gap.

Preferably, it is being characterized in that the ionic liquid includes at least any one of NaCl, LiCl, $NaNO_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol and AgCl.

And, an energy conversion device using a liquid is provided, which is includes: a first electrode substrate having a concave portion wherein a conductive liquid is stored; and a second electrode substrate having a convex portion corresponding to the concave portion and facing the first electrode substrate; wherein the gap between the electrode substrates is being changed by an external physical force, and the surface of the second electrode substrate which is in contact with the conductive liquid includes an energy conversion layer generating electrical energy in accordance with the change in the gap.

Preferably, it is being characterized in that the energy conversion layer includes at least any one of an inorganic material layer, an organic material layer and a layer comprising a mixture of organic and inorganic materials.

Preferably, it is being characterized in that a hydrophile material layer is stacked on the energy conversion layer so as to facilitate the change in contact surface, contact angle or contact area contacting the conductive liquid in accordance with the change in the gap.

Preferably, it is being characterized in that the hydrophile material layer includes: poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, or a material including at least any one functional group of —NH, —CO—, amino group —$NH_2$, hydroxyl group —OH and carboxyl group —COOH.

Preferably, it is being characterized in that the range of the specific resistivity of the conductive liquid is 1 $\mu\Omega$/cm to 1000 $\mu\Omega$/cm, and the dielectric constant K is not higher than 5.

Preferably, it is being characterized in that the energy conversion layer includes an organic material layer including at least any one material of polymethylmethacrylate (PMMA), polyethylene (PE), polystyrene (PS), polyvinylpyrrolidone (PVP), poly(4-vinylpenol) (PVP) Or polyethersulfone (PES), poly(4-methoxyphenylacrylate; PMPA), poly(phenylacrylate) (PPA), poly(2,2,2-trifluoroethyl methacrylate) (PTFMA), cyanoethylpullulan (CYEPL), polyvinyl chloride (PVC), poly(parabanic acid resin)(PPA), poly(t-butylstyrene) (PTBS), polythienylenevinylene (PTV), polyvinylacetate (PVA), poly(vinyl alcohol) (PVA), poly(rmethylstyrene) (PAMS), poly(vinyl alcohol)-co-poly(vinyl acetate)-co-poly (itaconic acid) (PVAIA), polyolefin, polyacrylate, parylene-C, polyimide, octadecyltrichlorosilane (OTS), poly(triarylamine) (PTTA), poly-3-hexylthiophene (P3HT), cross-linked poly-4-vinylphenol(cross-linked PVP), poly (perfluoroalkenylvinyl ether), nylon-6, n-octadecylphosphonic acid (ODPA), polytetrafluoroethylene (PTFE), silicone, polyurethane, latex, cellulose acetate, poly(hydroxy ethyl methacrylate) (PHEMA), polylactide (PLA), polyglycolide (PGA), and polyglycolide-co-lactide (PGLA).

Preferably, it is being characterized in that the energy conversion layer includes an inorganic material layer including: at least any one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide ($Y_2O_3$), cerium oxide ($CeO_2$), titanium dioxide ($TiO_2$), barium titanate ($BaTiO_3$), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), perovskite materials, strontium titanate (SrTiO3), barium strontium titanate (BST), lead zirconate titanate (PZT), calcium copper titanate (CCTO), $HfO_2$, apatite ($A_{10}$ ($MO_4)_6X_2$), hydroxyapatite ($Ca_{10}$ ($PO_4)_6$ $(OH)_2$), tricalcium phosphate ($Ca_3(PO_4)_2$), $Na_2O$—CaO—$SiO_2$, and bioglass (CaO—$SiO_2$—$P_2O_6$).

Preferably, it is being characterized in that the energy conversion device further includes a non-conductive gas, which is disposed between the first electrode substrate and the second electrode substrate and comprising at least any one of air, oxygen, nitrogen, argon, helium, neon, krypton, xenon, and radon.

Preferably, it is being characterized in that the first electrode substrate has the concave portion having a plurality of concave regions, and the second electrode substrate has the convex portion having a plurality of convex regions.

Preferably, it is being characterized in that the energy conversion layer has a structure formed therein for enlarging the contact surface contacting the liquid.

Preferably, it is being characterized in that the first electrode substrate or the second electrode substrate includes an electrode, and the electrode is an inorganic electrode including at least any one of ITO, IGO, chrome, aluminum, indium zinc oxide (IZO), indium gallium zinc oxide (IGZO), ZnO, $ZnO_2$ and $TiO_2$; or a metal electrode including at least any one of platinum, gold, silver, aluminum, iron and copper; or an organic electrode including at least any one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of crome, SUS 304, SUS 316, SUS 316L, Co—Cr alloy, Ti alloy, nitinol (Ni—Ti) and polyparaphenylenevinylene.

Preferably, it is being characterized in that at least any one of the first electrode substrate or the second electrode substrate is a metal substrate, a glass substrate, a ceramic substrate, or a polymer material substrate, wherein the polymer material substrate is a plastic substrate or a film which includes at least any one of polyethylene terephthalate (PET), polyarylate (PAR), polymethylmethacrylate (PMMA), polyethylenenaphthalate (PEN), polyethersulfone (PES), polyimide (PI), polycarbonate (PC) and fiber reinforced plastics (FRP), and the ceramic substrate is a substrate using a ceramic material which includes at least any one of alumina ($Al_2O_3$), berilia (BeO), aluminum nitride (AlN), silicon carbide (SiC), mullite, and silicon.

Preferably, it is being characterized in that the energy conversion device further includes a connecting unit supporting the space between the first electrode substrate and the second electrode substrate, and a shape of the connecting unit is restored to the original shape when the external physical force is removed.

Preferably, it is being characterized in that the shape of the connecting unit is to be at least one of a rectangular shape, a triangular shape, an inverted triangular shape, a circular shape, an elliptical shape, and cylindrical shape, and the shape of the energy conversion unit is to be a triangular shape, a rectangular shape, a pentagonal shape, a hexagonal shape, a circular shape, a grid-like shape, or a honeycomb shape according to the connecting unit for the energy conversion device be connected in an array form.

The details of the other exemplary embodiments are included in the detailed description of embodiments and the drawings.

Advantageous Effects of Invention

The present invention changes the contact surface of liquid between a pair of electrodes, and utilizes the resulting change in the contact surface of the liquid for electrical energy generation. Thus, it has an effect of implementing an energy conversion device having less failures with a simplified device structure and a reduced manufacturing cost by preventing the channel blocking phenomenon, and by not requiring any lubrication layer, or any complicatedly patterned electrodes in the channel.

In addition, the present invention is advantageous in that efficient electrical energy conversion is possible without separately applying external power.

And, the present invention has an effect on solving the harmful problem to the human body and the environment by using an ionic liquid or water.

Furthermore, the present invention is advantageous in that it is capable of producing a flexible device and facilitating large area application by having a simple device structure.

DETAILED DESCRIPTION OF EMBODIMENT

The advantages and the features of the present invention, and the method for achieving thereof will become apparent with reference to the exemplary embodiments described in detail hereinafter with the accompanying drawings. However, the present invention will not be limited to the exemplary embodiments described hereinafter, but will be implemented in a various different forms, and the exemplary embodiments are provided for the completeness of the disclosure of the present invention and to teach an ordinary person of skill in the art of the scope of the invention completely, and the present invention is only be defined by the scope of the claims. Meanwhile, the terms used in the description are for describing the exemplary embodiments, but not to limit the present invention.

Figure 1:
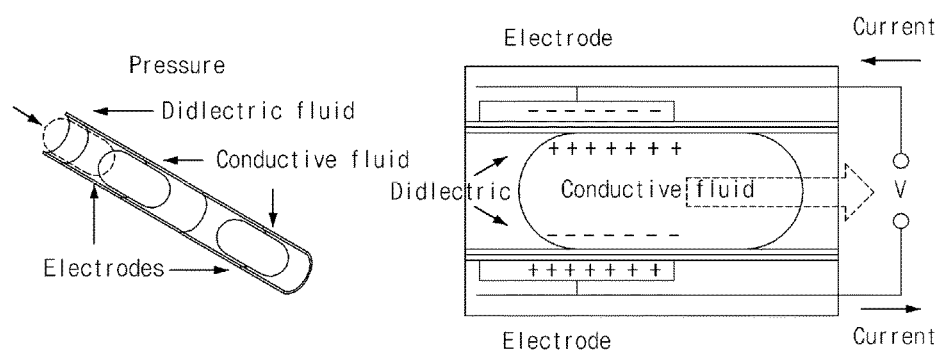
FIG. 1 is a block diagram of an energy conversion device using a fluid of prior art.
Figure 2:
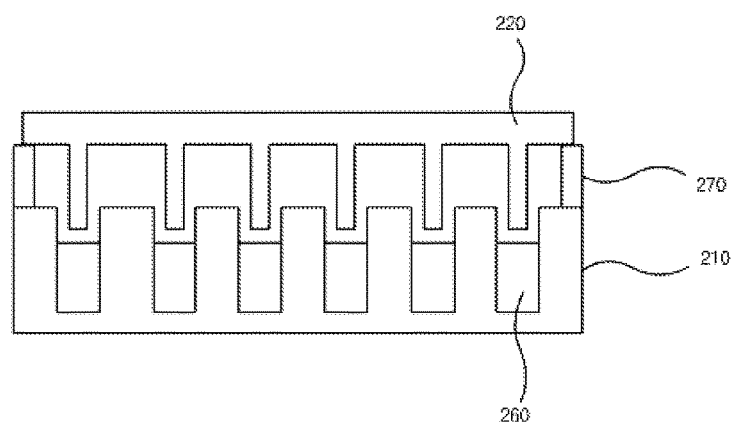
FIG. 2 is a schematic diagram of an energy conversion device according to an exemplary embodiment of the present invention.

FIG. 2 is a schematic diagram of a flexible energy conversion device using a liquid according to an exemplary embodiment of the present invention. Referring to FIG. 2, an energy conversion device using a liquid includes: a first electrode substrate 210 having a concave portion wherein an ionic liquid or water 260 is stored; and a second electrode substrate 220 having a convex portion corresponding to the concave portion and facing the first electrode substrate 210.

In addition, the gap between the first electrode substrate 210 and the second electrode substrate 220 is being changed by an external physical force, the surface of the second electrode substrate 220 which is in contact with the ionic liquid or water 260 further includes energy conversion layers 230 and 240 generating electrical energy in accordance with the change in the gap.

An energy conversion device using a liquid according to an exemplary embodiment of the present invention generates an electrical energy by producing a change in the electrical capacitance of the electrodes included in the first electrode substrate 210 and the second electrode substrate 220 according to the change in at least any one of the contact surface, the contact angle, and the contact area with the ionic liquid or water 260.

Figure 3:
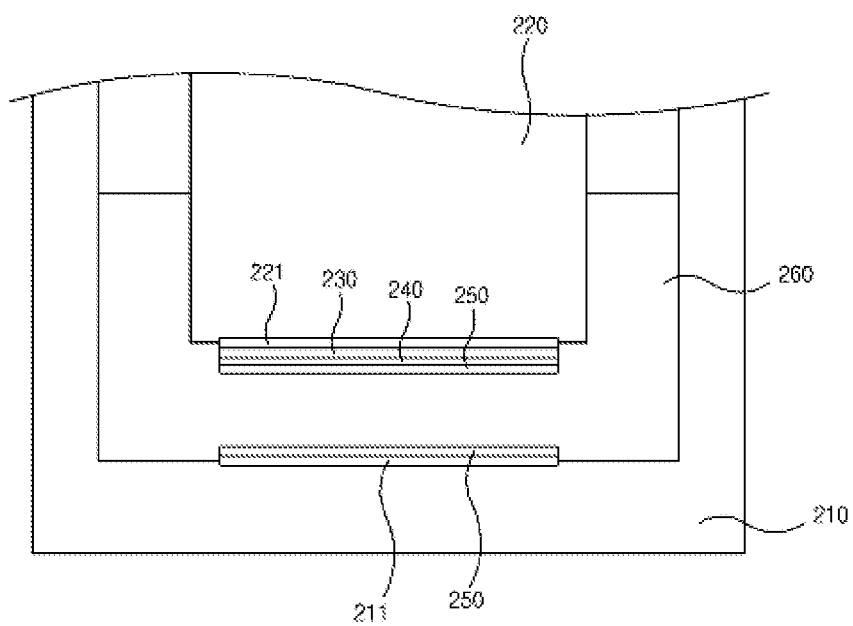
FIG. 3 is a block diagram illustrating an energy conversion device in detail according to an exemplary embodiment of the present invention.
Figure 4A:
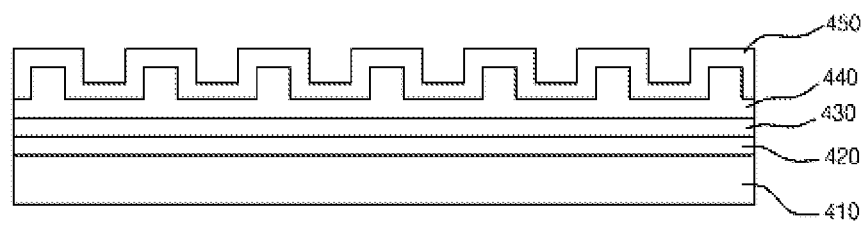
FIGS. 4a-4d are side views illustrating the exemplary embodiments of the energy conversion layer of an energy conversion device using change of contact surface with liquid according to an exemplary embodiment of the present invention.
Figure 4B:
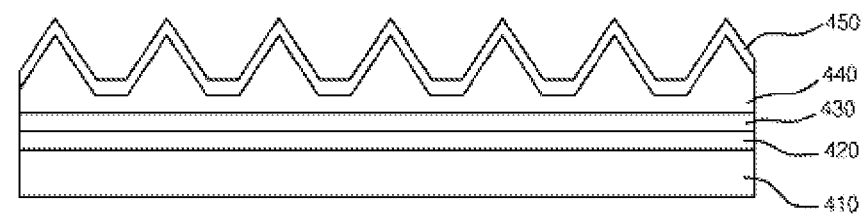
Figure 4C:
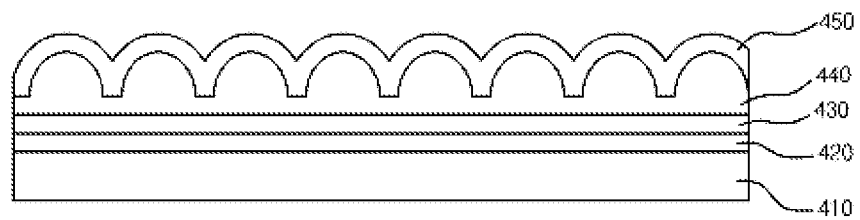
Figure 4D:
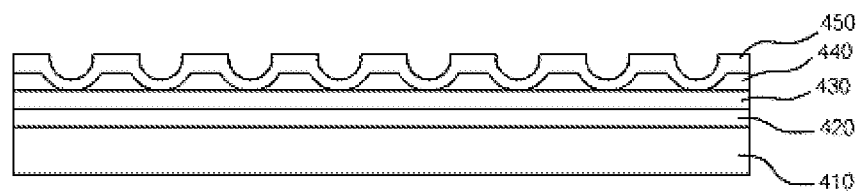

FIG. 3 is a block diagram illustrating an energy conversion device in detail according to an exemplary embodiment of the present invention. Referring to FIG. 3 illustrating an energy conversion device according to an exemplary embodiment of the present invention, an electrode 211 and an electrode 221, which are included in the first electrode substrate 210 and the second electrode substrate 220 respectively, are formed on the surfaces which are in contact with or contactable with the ionic liquid or water 260, and an inorganic material layer 230, an organic material layer 240, and a hydrophobic material layer 250 are sequentially stacked on the electrode 221.

That is, at least one of a contact surface, a contact angle, or a contact area of the ionic liquid or water 260 with the first electrode substrate 210 and the second electrode substrate 220, wherein energy conversion layers are formed, is changed in accordance with the change in the gap between the substrates so that an electrical energy is generated through this change.

The energy conversion layer is formed on a surface, wherein at least one of the contact surface, the contact angle, or the contact area thereof with an ionic liquid or water is being changed. In other words, the energy conversion layer is formed on a surface of the second electrode substrate 220, wherein the surface is capable of being submerged in an ionic liquid or water 260. Although an example of the energy conversion layer formed on the lower surface of the electrode substrate is illustrated in FIG. 3, it may also be formed on the side portion of the electrode substrate, and it may also be formed surrounding both the lower surface and the side portion of the electrode substrate.

According to a preferred exemplary embodiment of the present invention, an energy conversion layer is configured to include at least one of an inorganic material layer 230, an organic material layer 240, or a mixed material layer of an organic material and an inorganic material. Preferably, methods such as patterning, vacuum deposition, or spin coating may be used in forming such energy conversion layer.

Also, preferably, an inorganic material layer 230 and an organic material layer 240 is sequentially stacked for the energy conversion layer. In stacking the inorganic material layer 230 and the organic material layer 240 on the first electrode substrate 210 or on the second electrode substrate 220, the order of stacking will not matter, however, they must be stacked adjacently.

Preferably, the inorganic material layer 230 and the organic material layer 240 may be alternately and repeatedly filed up when being stacked on the first electrode substrate 210 or on the second electrode substrate 220. In other words, an energy conversion layer can be formed by repeatedly stacking the inorganic material layer 230 and the organic material layer 240.

Preferably, an inorganic material layer 230 or an organic material layer 240 is deposited such that a structure for enlarging the contact surface with the ionic liquid or water 260 is formed therein.

FIGS. 4a-4d are side views illustrating the exemplary embodiments of the energy conversion layer of an energy conversion device using the change of contact surface with liquid according to an exemplary embodiment of the present invention. Referring to FIGS. 4a-4d, an inorganic material layer 430 is deposited on the electrode 420 which is included in the second electrode substrate 410 as an energy conversion layer of an energy conversion device using the change of contact surface with liquid according to an exemplary embodiment of the present invention. The organic material layer 440 is stacked on the inorganic material layer 430 to form a micro structure having shapes such as a convex-concave shape shown in FIG. 4a, a sharply protruded shape shown in FIG. 4b, a semi sphere shape shown in FIG. 4c, and a spherical pit shape shown FIG. 4d. Preferably, the stacking order between the organic material layer 440 and the inorganic material layer 430 may be reversed, and the stacking material for forming the structure is not necessarily to be an organic material layer 440.

Preferably, a hydrophobic material layer 450 is stacked on the organic material layer 440 which is being stacked for forming the structure so that the shape of the structure is being maintained.

Such shapes of the structure have effects on increasing the generation efficiency of electrical energy by enlarging the change in the contact area between the electrodes and the ionic liquid or water.

Again referring to FIG. 3, preferably, a plurality of energy conversion devices using the change of contact surface with liquid are connected in an array form. As previously described, this is to increase the generation efficiency of electrical energy by enlarging the change in the contact area between the electrodes and the ionic liquid or water.

According to a preferred exemplary embodiment of the present invention, a hydrophobic material layer 250 is stacked on the energy conversion layers 230 and 240 in order to facilitate the changes in at least one of a contact surface, a contact angle, or a contact area between the electrodes 210 and 220 and the ionic liquid or water 260.

Preferably, the hydrophobic material layer 250 may be stacked on the first electrode substrate 210 or on the second electrode substrate 220 wherein no energy conversion layer is formed.

According to a preferred exemplary embodiment of the present invention, an energy conversion layer is configured to include: an organic material layer 240 including at least any one material of polymethylmethacrylate (PMMA), polyethylene(PE), polystyrene (PS), polyvinylpyrrolidone (PVP), poly(4-vinylpenol) (PVP) Or polyethersulfone (PES), poly(4-methoxyphenylacrylate; PMPA), poly(phenylacrylate)(PPA), poly(2,2,2-trifluoroethyl methacrylate) (PTFMA), cyanoethylpullulan (CYEPL), polyvinyl chloride (PVC), poly(parabanic acid resin) (PPA), poly(t-butylstyrene)(PTBS), polythienylenevinylene (PTV), polyvinylacetate (PVA), poly(vinyl alcohol)(PVA), poly(rmethylstyrene)(PAMS), poly(vinyl alcohol)-co-poly(vinyl acetate)-co-poly(itaconic acid) (PVAIA), polyolefin, polyacrylate, parylene-C, polyimide, octadecyltrichlorosilane (OTS), poly(triarylamine) (PTTA), poly-3-hexylthiophene(P3HT), cross-linked poly-4-vinylphenol(cross-linked PVP), poly(perfluoroalkenylvinyl ether), nylon-6, n-octadecylphosphonic acid (ODPA), polytetrafluoroethylene (PTFE), silicone, polyurethane, latex, cellulose acetate, poly(hydroxy ethyl methacrylate) (PHEMA), polylactide (PLA), polyglycolide (PGA), or polyglycolide-co-lactide (PGLA); and an inorganic material layer 230 including at least any one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide($Y_2O_3$), cerium oxide ($CeO_2$), titanium dioxide ($TiO_2$), barium titanate ($BaTiO_3$), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), as perovskite materials, strontium titanate (SrTiO3), barium strontium titanate (BST), lead zirconate titanate (PZT), calcium copper titanate (CCTO), or $HfO_2$, apatite ($A_{10}(MO_4)_6X_2$), hydroxyapatite ($Ca_{10}(PO_4)_6(OH)_2$), tricalcium phosphate ($Ca_3(PO_4)_2$), $Na_2O$—CaO—$SiO_2$, or bioglass (CaO—$SiO_2$—$P_2O_5$).

Preferably, a material having dielectric constant (K) lower than 4 may be used for the organic material 240, and a material having dielectric constant (K) higher than 5 may be used for the inorganic material 230.

According to a preferred exemplary embodiment of the present invention, hydrophobic material layer 250 includes at least any one or a mixture of silane family material, fluoropolymer material, trichlorosilane, trimethoxysilane, pentafluorophenylpropyltrichlorosilane, (benzyloxy) alkyltrimethoxysilane (BSM-22), (benzyloxy)alkyltrichlorosilane (BTS), hexamethyldisilazane (HMDS), octadecyltrichlorosilane (OTS), octadecyltrimethoxysilane (OTMS), and divinyltetramethyldisiloxane-bis(benzocyclobutene)(BCB).

According to a preferred exemplary embodiment of the present invention, the electrodes used in the first electrode 210 or the second electrode 220 is an inorganic electrode which includes at least any one of ITO, IGO, chrome, aluminum, indium zinc oxide (IZO), indium gallium zinc oxide (IGZO), ZnO, $ZnO_2$ or $TiO_2$; or a metal electrode including at least any one of aluminum, iron or copper; or an organic electrode including at least any one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of chrome, SUS 304, SUS 316, SUS 316L, Co—Cr alloy, Ti alloy, nitinol (Ni—Ti), or polyparaphenylenevinylene.

In addition, according to a preferred exemplary embodiment of the present invention, the first electrode substrate 210 or the second electrode substrate 220 is a metal substrate, a glass substrate, a ceramic substrate, or a polymer material substrate. Here, the polymer material substrate is a plastic substrate or a film which includes at least any one of polyethylene terephthalate (PET), polyarylate (PAR), polymethylmethacrylate (PMMA), polyethylenenaphthalate (PEN), polyethersulfone (PES), polyimide (PI), polycarbonate (PC) or fiber reinforced plastics (FRP). In addition, the ceramic substrate is a substrate using a ceramic material which includes at least any one of alumina ($Al_2O_3$), berilia (BeO), aluminum nitride (AlN), silicon carbide (SiC), mullite, or silicon.

According to a preferred exemplary embodiment of the present invention, the ionic liquid 260 includes at least any one of NaCl, LiCl, $NaNO_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol or AgCl.

According to a preferred exemplary embodiment of the present invention, it is configured to fill the space between the first electrode substrate 210 and the second electrode substrate 220 with a non-conductive gas. Generally, the space between the first electrode substrate 210 and the second electrode substrate 220 could be a normal aerial environment.

According to a preferred exemplary embodiment of the present invention, the non-conductive gas includes at least any one of air, oxygen, nitrogen, argon, helium, neon, krypton, xenon, or radon.

According to a preferred exemplary embodiment of the present invention, the connecting unit 270 supports the space between the first electrode substrate and the second electrode substrate.

Besides, the shape of the connecting unit 270 is changed by an external physical force, and it has a restoring force or flexibility restoring the original shape when the external physical force is removed.

According to a preferred exemplary embodiment of the present invention, the shape of the connecting unit 270 is to be at least one of a rectangular shape, a triangular shape, an inverted triangular shape, a circular shape, an elliptical shape, or a cylindrical shape.

Therefore, the energy conversion device according to a preferred exemplary embodiment of the present invention may be connected in an array form by the connecting unit 270. That is, the shape of the energy conversion unit is to be a triangular shape, a rectangular shape, a pentagonal shape, a hexagonal shape, a circular shape, a grid-like shape, or a honeycomb shape according to the connecting unit 270.

In addition, preferably, the shape of the connecting unit 270 may be a a rectangular shape, a triangular shape, an inverted triangular shape, a circular shape, an elliptical shape, or a cylindrical shape, and the shape of a unit cell of the energy conversion device (a 'Cell' comprising an upper plate, a lower plate, a side wall, a liquid, and a gas) is possible to be a triangular shape, a rectangular shape, a pentagonal shape, a hexagonal shape, a circular shape, a grid-like shape, or a honeycomb shape according to the connecting unit 270.

Figure 5:
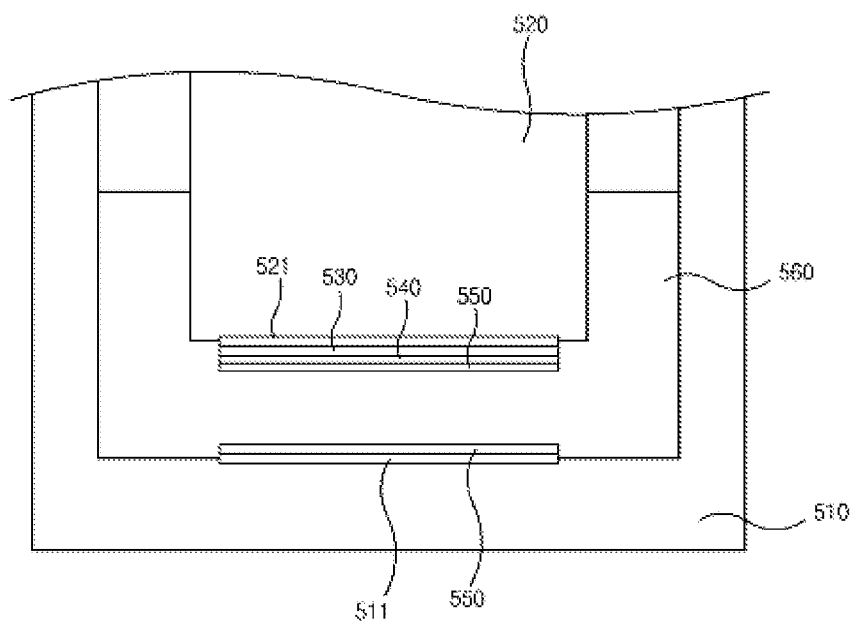
FIG. 5 is a schematic diagram of an energy conversion device using change of contact surface with liquid according to another exemplary embodiment of the present invention.

FIG. 5 is a schematic diagram of an energy conversion device using a liquid according to another exemplary embodiment of the present invention. Referring to FIG. 5, an energy conversion device using a liquid according to another exemplary embodiment of the present invention is configured to include: a first electrode substrate 510 having a concave portion wherein an ionic liquid or water 560 is stored; and a second electrode substrate 520 having a convex portion corresponding to the concave portion and facing the first electrode substrate 510; and a connecting unit (not shown) having flexibility enabling the change in the gap of the above mentioned electrode substrates, and connecting the electrode substrates.

Furthermore, an energy conversion layer, which is formed on at least one of a surface of the first electrode substrate 510 contacting a conductive liquid 560 and a surface of the second electrode substrate 520, and generates an electrical energy according to the change in the gap, is further included An energy conversion device using a liquid according to another exemplary embodiment of the present invention generates an electrical energy by producing a change in the electrical capacitance of the electrodes included in the first electrode substrate 510 and the second electrode substrate 520 according to the change in at least any one of the contact surface, the contact angle, and the contact area with the ionic liquid or water 560.

According to a preferred exemplary embodiment of the present invention, it is preferred that the conductive liquid 660 may use mercury, lithium, gallium, kalium, NaK, bismuth, tin, natrium, natrium-kalium alloy, and the like; the range of the specific resistivity is 1 µΩ/cm to 1000 µΩ/cm, and the dielectric constant K is not higher than 5.

According to a preferred exemplary embodiment of the present invention, a hydrophile material layer 650 is stacked on the energy conversion layers 630 and 640 so as to facilitate the changes in contact surface between the conductive liquid 660 and the electrode substrates 610 and 620.

According to a preferred exemplary embodiment of the present invention, a hydrophile material layer 650 includes poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, and materials including at least any one functional group of —NH, —CO—, amino group —NH$_2$, hydroxyl group —OH or carboxyl group —COOH.

Besides, in the above described exemplary embodiment using a conductive liquid, the detailed descriptions of the technical contents related to materials of the electrodes or the substrates constituting the first electrode substrate 610 and the second electrode substrate 620, the features and the structure of the inorganic material layer 630 and the organic material layer 640, the usage of the energy conversion devices of the present invention in a multiple manner, and the like are omitted since it can be configured according to the foregoing exemplary embodiments using the ionic liquid or water, or the contents described in FIG. 2 or FIG. 3, and FIGS. 4a to 4b.

As reviewed before, when compared with prior art using more than two different kinds of liquids, the present invention may prevent blocking and mixing phenomena inside the channel, and also it does not require any lubricating layer.

Furthermore, although the technologies of prior art suggests an insulation layer comprising a single self assembly molecular monolayer and a single dielectric layer, or more layers of non-conductive layers, or the various combination thereof, however, the present invention suggests a structure for optimizing the energy conversion efficiency. In other words, it is configured to have a structure of electrode/inorganic material layer/organic material layer/(select one from hydrophobic material layer and hydrophile material layer according to the liquid type) or electrode/organic material layer/inorganic material layer/(select one from hydrophobic material layer and hydrophile material layer according to the liquid type) (according to the stacking order) on a substrate from an upper electrode substrate or a lower electrode substrate, wherein at least one of the contact surface, the contact angle, and the contact area with the liquid is being changed, and it may be changed to be configured to have a structure of electrode/inorganic material layer/organic material layer/(select one from hydrophobic material layer and hydrophile material layer according to the liquid type) or electrode/organic material layer/inorganic material layer/(select one from hydrophobic material layer and hydrophile material layer according to the liquid type) (according to the stacking order) on both of the first electrode substrate and the second electrode substrate.

And, application of an external power source for depolarization is required in using a conductive liquid according to the technology of prior art, however, application of an external power source is not required in the present invention since the energy conversion layer performs depolarizing function for the ionic liquid.

Besides, the present invention has high availability especially for an energy conversion device on a road and a sidewalk, wherein a lower unit capable of holding an ionic liquid or water is provided, and an elastomer is disposed between the upper unit and the lower unit so that when an external physical force is applied thereto, a portion of the upper unit touches the liquid inside the lower unit resulting in a change in the contact angle and the contact area, thus, a mechanical energy is being converted into an electrical energy owing to this change.

Although the preferred exemplary embodiments and the application examples are illustrated and described, heretofore, the present invention is not limited by the above described specific exemplary embodiments and the application examples, naturally, various variant embodiments are possible by a person of ordinary skill in the art without departing the gist of the present invention claimed within the scope of the claims, and these variant embodiments should not be individually understood from the technical spirit or the expectation of the present invention.

DESCRIPTION OF SYMBOLS

210: first electrode substrate
221: second electrode substrate
230: inorganic material layer
240: organic material layer
250: hydrophobic material layer
260: ionic liquid or water
270: connecting unit

What is claimed is:

1. An energy conversion device using a liquid comprising:
a first electrode substrate having a concave portion wherein an ionic liquid or water is stored; and
a second electrode substrate having a convex portion corresponding to the concave portion and facing the first electrode substrate;
wherein a gap between the electrode substrates is being changed by an external physical force, and a surface of the second electrode substrate which is in contact with the ionic liquid and water includes an energy conversion layer generating electrical energy in accordance with a change in the gap.

2. The energy conversion device using a liquid according to claim 1, wherein the energy conversion layer includes at least any one of an inorganic material layer, an organic material layer and a layer comprising a mixture of organic and inorganic materials.

3. The energy conversion device using a liquid according to claim 2, wherein a hydrophobic material layer is stacked on the energy conversion layer so as to facilitate a change in contact surface, contact angle or contact area contacting the ionic liquid or the water in accordance with the change in the gap.

4. The energy conversion device using a liquid according to claim 1, wherein the ionic liquid includes at least any one of NaCl, LiCl, NaNO$_3$, Na$_2$SiO$_3$, AlCl$_3$—NaCl, LiCl—KCl, KCl, Na, NaOH H$_2$SO$_4$, CH$_3$COOH, HF, CuSO$_4$, ethylene glycol, propylene glycol and AgCl.

5. An energy conversion device using a liquid comprising:
a first electrode substrate having a concave portion wherein a conductive liquid is stored; and
a second electrode substrate having a convex portion corresponding to the concave portion and facing the first electrode substrate,
wherein a gap between the electrode substrates is changed by an external physical force, and a surface of the second electrode substrate which is in contact with the conductive liquid includes an energy conversion layer generating electrical energy in accordance with a change in the gap.

6. The energy conversion device using a liquid according to claim 5, wherein the energy conversion layer includes at least any one of an inorganic material layer, an organic material layer and a layer comprising a mixture of organic and inorganic materials.

7. The energy conversion device using a liquid according to claim 6, wherein a hydrophile material layer is stacked on the energy conversion layer so as to facilitate a change in contact surface, contact angle or contact area contacting the conductive liquid in accordance with the change in the gap.

8. The energy conversion device using a liquid according to claim 7, wherein the hydrophile material layer includes:
poly acrylic acid(PAA), acrylamides, maleic anhydride copolymers, methacrylate, ethacrylate, amine-functional polymers, amine-functional polymers, polystyrenesulfonate(PSS), vinyl acids, vinyl alcohols, or a material including at least any one functional group of —NH, —CO—, amino group —NH$_2$, hydroxyl group -OH and carboxyl group —COOH.

9. The energy conversion device using a liquid according to claim 5, wherein a range of a specific resistivity of the conductive liquid is 1 μΩ/cm to 1000 μΩ/cm, and the dielectric constant K is not higher than 5.

10. The energy conversion device using a liquid according to claim 1, wherein the energy conversion layer includes:
an organic material layer including at least any one material of polymethylmethacrylate(PMMA), polyethylene(PE), polystyrene(PS), polyvinylpyrrolidone (PVP), poly(4-vinylpenol)(PVP) or polyethersulfone (PES), poly(4-methoxyphenylacrylate; PMPA), poly (phenylacrylate)(PPA), poly(2,2,2-trifluoroethyl methacrylate)(PTFMA), cyanoethylpullulan(CYEPL), polyvinyl chloride(PVC), poly(parabanic acid resin) (PPA), poly(t-butylstyrene)(PTBS), polythienylenevinylene(PTV), polyvinylacetate(PVA), poly(vinyl alcohol)(PVA), poly(rmethylstyrene)(PAMS), poly(vinyl alcohol)-co-poly(vinyl acetate)-co-poly(itaconic acid) (PVAIA), polyolefin, polyacrylate, parylene-C, polyimide, octadecyltrichlorosilane(OTS), poly(triarylamine)(PTTA), poly-3-hexylthiophene(P3HT), crosslinked poly-4-vinylphenol(cross-linked PVP), poly (perfluoroalkenylvinyl ether), nylon-6, n-octadecylphosphonic acid(ODPA), silicone, polyurethane, latex, cellulose acetate, poly(hydroxy ethyl methacrylate)(PHEMA), polylactide(PLA), polyglycolide(PGA), and polyglycolide-co-lactide(PGLA).

11. The energy conversion device using a liquid according to claim 1, wherein the energy conversion layer includes:
an inorganic material layer including at least any one material of SiO$_2$, TiO$_2$, Al$_2$O$_3$, Ta$_2$O$_5$, tantalum pentoxide, zinc oxide (ZnO), tantalum pentoxide (Ta$_2$O$_5$), yttrium oxide (Y$_2$O$_3$), cerium oxide (CeO$_2$), titanium dioxide (TiO$_2$), barium titanate (BaTiO$_3$), barium zirconate titanate (BZT), zirconium dioxide (ZrO$_2$), lanthanum oxide (La$_2$O$_3$), hafnon (HfSiO$_4$), lanthanum aluminate (LaAlO$_3$), silicon nitride (Si$_3$N$_4$), perovskite materials, strontium titanate (SrTiO3), barium strontium titanate (BST), lead zirconate titanate (PZT), calcium copper titanate (CCTO), HfO$_2$, apatite (A$_{10}$(MO$_4$)$_6$X$_2$), hydroxyapatite (Ca$_{10}$(PO$_4$)$_6$(OH)$_2$), tricalcium phosphate (Ca$_3$(PO$_4$)$_2$), Na$_2$O—CaO—SiO$_2$, and bioglass (CaO—SiO$_2$—P$_2$O$_5$).

12. The energy conversion device using a liquid according to claim 1, further comprising a non-conductive gas, which is disposed between the first electrode substrate and the second electrode substrate and comprising at least any one of oxygen, nitrogen, argon, helium, neon, krypton, xenon, and radon.

13. The energy conversion device using a liquid according to claim 1, wherein the first electrode substrate has the concave portion having a plurality of concave regions, and the second electrode substrate has the convex portion having a plurality of convex regions.

14. The energy conversion device using a liquid according to claim 1, wherein the energy conversion layer has a structure formed therein for enlarging the contact surface contacting the liquid.

15. The energy conversion device using a liquid according to claim 1, wherein the first electrode substrate or the second electrode substrate includes an electrode, and the electrode is an inorganic electrode including at least any one of ITO, IGO, chrome, aluminum, indium zinc oxide (IZO), indium gallium zinc oxide (IGZO), ZnO, $ZnO_2$ and $TiO_2$; or a metal electrode including at least any one of platinum, gold, silver, aluminum, iron and copper; or an organic electrode including at least any one of polyethylenedioxythiophene (PEDOT), carbon nano tube (CNT), graphene, polyacetylene, polythiophene (PT), polypyrrole, polyparaphenylene (PPV), polyanilinep), poly sulfur nitride, stainless steel, iron alloy containing more than 10% of crome, SUS 304, SUS 316, SUS 316L, Co—Cr alloy, Ti alloy, nitinol (Ni—Ti) and polyparaphenylenevinylene.

16. The energy conversion device using a liquid according to claim 1, wherein at least any one of the first electrode substrate or the second electrode substrate is a metal substrate, a glass substrate, a ceramic substrate, or a polymer material substrate,
wherein the polymer material substrate is a plastic substrate or a film which includes at least any one of polyethylene terephthalate (PET), polyarylate (PAR), polymethylmethacrylate (PMMA), polyethylenenaphthalate (PEN), polyethersulfone (PES), polyimide (PI), polycarbonate (PC) and fiber reinforced plastics (FRP), and
the ceramic substrate is a substrate using a ceramic material which includes at least any one of alumina ($Al_2O_3$), berilia (BeO), aluminum nitride (AlN), silicon carbide (SiC), mullite, and silicon.

17. The energy conversion device using a liquid according to claim 1, further comprising a connecting unit supporting the space between the first electrode substrate and the second electrode substrate, and a shape of the connecting unit is restored to an original shape when an external physical force is removed.

18. The energy conversion device using a liquid according to claim 17, wherein the shape of the connecting unit is at least one of a rectangular shape, a triangular shape, an inverted triangular shape, a circular shape, an elliptical shape, and cylindrical shape, and
a shape of the energy conversion unit is a triangular shape, a rectangular shape, a pentagonal shape, a hexagonal shape, a circular shape, a grid-like shape, or a honeycomb shape according to the connecting unit for the energy conversion device to be connected in an array form.

19. An energy conversion device using a liquid comprising:
a first electrode substrate having a concave portion wherein an ionic liquid or water is stored; and
a second electrode substrate having a convex portion corresponding to the concave portion and facing the first electrode substrate;
wherein a distance between the concave portion of the first electrode substrate and the convex portion of the second electrode substrate facing the concave portion of the first electrode substrate is changed by an external physical force, and a surface of the second electrode substrate which is in contact with the ionic liquid and water includes an energy conversion layer generating electrical energy in accordance with a change in the distance.

* * * * *